(12) United States Patent
Adeli-Nadjafi

(10) Patent No.: US 11,544,626 B2
(45) Date of Patent: Jan. 3, 2023

(54) METHODS AND SYSTEMS FOR CLASSIFYING RESOURCES TO NICHE MODELS

(71) Applicant: Alireza Adeli-Nadjafi, Boston, MA (US)

(72) Inventor: Alireza Adeli-Nadjafi, Boston, MA (US)

(73) Assignee: Alireza Adeli-Nadjafi, Boston, MA (US)

( * ) Notice: Subject to any disclaimer, the term of this patent is extended or adjusted under 35 U.S.C. 154(b) by 0 days.

(21) Appl. No.: 17/335,135

(22) Filed: Jun. 1, 2021

(65) Prior Publication Data

US 2022/0383186 A1 Dec. 1, 2022

(51) Int. Cl.
*G06N 5/04* (2006.01)
*G06N 20/00* (2019.01)

(52) U.S. Cl.
CPC ............ *G06N 20/00* (2019.01); *G06N 5/048* (2013.01)

(58) Field of Classification Search
CPC ................................ G06N 20/00; G06N 5/048
See application file for complete search history.

(56) References Cited

U.S. PATENT DOCUMENTS

| | | | |
|---|---|---|---|
| 2005/0246299 A1* | 11/2005 | Scarborough | G06Q 10/10 706/21 |
| 2008/0147630 A1 | 6/2008 | Chu | |
| 2012/0215710 A1 | 8/2012 | Scarborough | |
| 2015/0127567 A1* | 5/2015 | Menon | G06Q 10/1053 705/321 |
| 2018/0060823 A1 | 3/2018 | Garimella | |
| 2019/0220824 A1 | 7/2019 | Liu | |
| 2019/0303877 A1 | 10/2019 | Mccann | |
| 2020/0193382 A1 | 6/2020 | Michaels | |

(Continued)

FOREIGN PATENT DOCUMENTS

| KR | 1020120126155 A | 11/2012 | |
|---|---|---|---|
| WO | WO-2019108133 A1 * | 6/2019 | ........... G06Q 10/105 |

OTHER PUBLICATIONS

Title: HiringSolved Named No. 2 Most Innovative Company in AI Industry by: Jeremy Roberts Date: Feb. 22, 2019.

(Continued)

*Primary Examiner* — Lut Wong
(74) *Attorney, Agent, or Firm* — Caldwell Intellectual Property Law

(57) ABSTRACT

A system for classifying resources to niche models includes a computing device configured to receive a plurality of resource data corresponding to a plurality of resources, generate a plurality of resource models, generating a resource model corresponding to the resource as a function of the plurality of resource data and the merit quantitative field, compute a niche model having a plurality of niche data and an output quantitative field, combine the niche model with at least a selected resource model corresponding to a selected resource of the plurality of resources by classifying the output quantitative field to at least a selected merit quantitative field of the resource model and a niche datum of the plurality of niche data to at least a datum of the plurality of resource data, and provide an indication of the at least a selected resource model to a client device of the niche model.

20 Claims, 7 Drawing Sheets

(56) References Cited

U.S. PATENT DOCUMENTS

2020/0273127 A1    8/2020  Aldworth
2021/0089603 A1*   3/2021  Abbasi Moghaddam ...................
                                                    G06K 9/6282

OTHER PUBLICATIONS

Title: New Candidate Match™ Solution from Dice Leverages Proprietary Matching Algorithms to Speed Recruiting Tech Talent by: Rachel Ceccarelli Date: May 29, 2019.
Title: ELISE Matching Software Delivers Unprecedented Speed and Accuracy on Mega Data Searches by: PR Newswire Date: Apr. 26, 2004.

* cited by examiner

METHODS AND SYSTEMS FOR CLASSIFYING RESOURCES TO NICHE MODELS

FIELD OF THE INVENTION

The present invention generally relates to the field of artificial intelligence simulation and modeling. In particular, the present invention is directed to methods and systems for classifying resources to niche models.

BACKGROUND

Reliable classification of resources to niches remains elusive in existing systems. This is due at least in part to a paucity of accurate methods for predicting suitability of such pairings given available data, as well as to the unreliability and complexity of such data.

SUMMARY OF THE DISCLOSURE

In an aspect, a system for classifying resources to niche models includes a computing device configured to receive a plurality of resource data corresponding to a plurality of resources, generate a plurality of resource models, wherein generating the plurality of resource models further includes deriving, for each resource and as a function of the plurality of resource data, a merit quantitative field and generating a resource model corresponding to the resource as a function of the plurality of resource data and the merit quantitative field, compute a niche model, wherein the niche model includes a plurality of niche data and an output quantitative field, combine the niche model with at least a selected resource model corresponding to a selected resource of the plurality of resources, wherein combining further includes classifying the output quantitative field to at least a selected merit quantitative field of the at least a selected resource model and classifying at least a niche datum of the plurality of niche data to at least a datum of the plurality of resource data, and provide an indication of the at least a selected resource model to a client device of the niche model.

In another aspect, a method of classifying resource models to niche models includes receiving, by a computing device, a plurality of resource data corresponding to a plurality of resources. The method includes generating, by the computing device, a plurality of resource models, wherein generating the plurality of resource models further includes deriving, for each resource and as a function of the plurality of resource data, a merit quantitative field and generating a resource model corresponding to the resource as a function of the plurality of resource data and the merit quantitative field. The method includes computing by the computing device, a niche model, wherein the niche model includes a plurality of niche data and an output quantitative field. The method includes combining, by the computing device, the niche model with at least a selected resource model corresponding to a selected resource of the plurality of resources, wherein classifying further includes classifying the output quantitative field to at least a selected merit quantitative field of the at least a selected resource model and classifying at least a niche datum of the plurality of niche data to at least a datum of the plurality of resource data. The method includes providing, by the computing device, an indication of the at least a selected resource model to a client device of the niche model.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Embodiments described herein classify niche models to resource models 116 utilizing merit quantitative fields, output quantitative fields, resource data, and/or niche data. Classification may be performed using machine learning processes such as K-nearest neighbors, Naïve Bayes, and/or neural networks; classification may alternatively or additionally be performed using one or more fuzzy matching processes using fuzzy sets and/or inference systems. Quantitative fields, including fuzzy sets, may similarly be generated using machine-learning processes.

Figure 1:
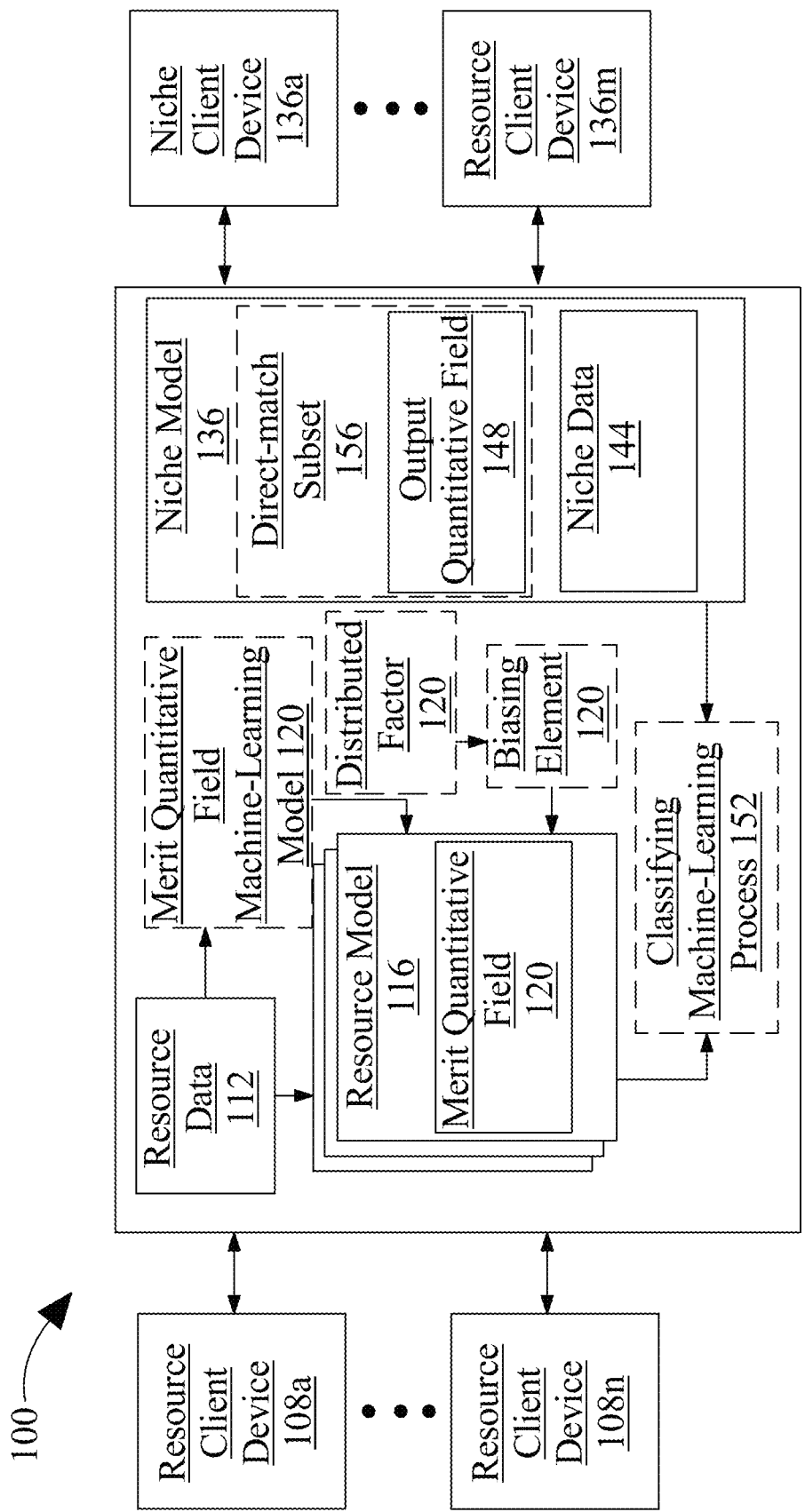
FIG. 1 is a block diagram illustrating an exemplary embodiment of a system for classifying resources to niche models.

Referring now to FIG. 1, an exemplary embodiment of a system 100 for classifying resources to niche models is illustrated. System includes a computing device 104. Computing device 104 may include any computing device 104 as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently, or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device 104.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In an embodiment, and still referring to FIG. 1, computing device 104 is configured to receive, from one or more resource client devices 108*a-n*, a plurality of resource data 112 corresponding to a plurality of resources. A "resource," as used in this disclosure, is a person or entity seeking to perform a role in an organization, such as a prospective employee, contractor, gig worker, or the like. For the purposes of this disclosure, "resource data 112" is any data describing a resource, aside from a merit quantitative field 120 as described below, including according to any examples as described below. Resource client device 108*a-n* may be implemented, without limitation, in any manner suitable for implementation of computing device 104 as described above, and may include, without limitation, any suitable device operated by and/or belonging to a resource, including a mobile device such as a smartphone, tablet or the like, a laptop, a desktop computer, a workstation, or any other such device that may occur to a person skilled in the art upon reviewing the entirety of this disclosure.

With continued reference to FIG. 1, computing device 104 is configured to generate a plurality of resource models 116. A "resource model," as used in this disclosure, is a data structure representing a corresponding resource in system 100. Resource model 116 may be implemented in any manner suitable for implementation of a data structure that includes data as described in further detail below. Generating the plurality of resource models 116 may include deriving, for each resource and as a function of the plurality of resource data 112, a merit quantitative field 120. A "merit quantitative field," as used in this disclosure, is a quantitative field representing a cost or value associated with a resource. A merit quantitative field 120 may include, without limitation, an hourly or other wage, a salary, a flat fee for services, or the like. A "quantitative field," as used in this disclosure, is a quantitative value or set, such as a number, a range of numbers, an n-tuple of numbers, or the like. In an embodiment, merit quantitative field 120 may include a fuzzy set as described in further detail below. For instance, and without limitation, fuzzy set may include a center and/or centroid at a most likely and/or desirable value, a range weighted by likely preference for resource and/or niche and/or by likelihood of a positive match. Weighting may be tuned according to one or more machine-learning processes as described in further detail below. In an embodiment, and as described in further detail below, weighting may be represented by a membership function curve, for which higher values may represent a greater degree of membership in a fuzzy set, while lower values represent a lower degree of membership therein. Merit quantitative field 120 may include a bivalent set defined on an interval, for instance as described in further detail below.

Still referring to FIG. 1, computing device 104 may derive merit quantitative field 120 by, as a non-limiting example, calculating a number and/or range of numbers representing a merit quantitative value likely to be paid to a resource given supply, demand, and/or other labor market considerations and/or an amount a resource is likely to request, desire or demand. Such calculation may be based on inputs such as, without limitation, a location where work is to take place, whether the opportunity to perform the work and/or job offer is for a job to be commenced on the same day as a process for classification as described herein, or the like, for instance and without limitation as described in further detail below. Alternatively or additionally, computing device 104 may derive merit quantitative field 120 by providing a merit quantitative field machine-learning model 124 and deriving the merit quantitative field 120 as a function of the plurality of resource data 112 and the machine-learning model; this may be performed, without limitation as described in further detail below.

Further referring to FIG. 1, computing device 104 may be configured to generate merit quantitative field 120 by generating a biasing element 128 and generating the merit quantitative field 120 as a function of the biasing element 128. A "biasing element," as used in this disclosure, is a numerical element added to or otherwise combined with a quantifier such as a merit quantifier to create a modified merit quantifier, for instance, by weighting the quantifier, begin added thereto, or the like. A biasing element 128 may include, for instance a score or rating of resource that indicates a perception among, for instance, peers, licensing boards, managers, or the like of performance and/or social skills of resource. Further examples of biasing elements 128 are described in further detail below. Computing device 104 may be configured to tune the biasing element 128 as a function of a plurality of distributed factors 132. A "distributed factor 132," as used herein, is a quantitative and/or quantifiable datum received from at least one additional participant in system and/or a device of such participant, such as without limitation a resource client device 108*a-n*, niche client device 136*a-m*, or the like. As a non-limiting example, distributed factors 132 may include ratings from peers, which may be used to calculate, tune, and/or otherwise derive a biasing element 128 such without limitation a social rating. Tuning may be performed using aggregation such as averaging according to an arithmetic and/or multiplicative mean, a weighted sum of inputs or the like, and/or using one or more machine-learning processes and/or models as described in further detail below.

Still referring to FIG. 1, computing device 104 is configured to generate a resource model 116 corresponding to each resource as a function of plurality of resource data 112 and merit quantitative field 120 associated with that resource. Computing device 104 may generate resource model 116 by collecting, aggregating, or otherwise combining resource data 112 corresponding to that resource, for instance and without limitation as described below, together with merit quantitative field 120, for instance as described in further detail below. Elements of resource data 112 used in resource model 116 may include one or more elements to be used in matching resource model 116 to a niche model 140 as described in further detail below.

With continued reference to FIG. 1, computing device 104 is configured to compute a niche model 140. As used in this disclosure, a "niche model 140" is a data representation of a niche, which is defined as a job opening, gig, temporary or permanent employment opportunity, or the like. A niche model 140 may be implemented using any data structure suitable for implementation of a resource mode. "Computing" as used in this context, refers to retrieval from storage in a database or other memory of and/or accessible to computing device 104 and/or to generation, of niche model 140. Niche model 140 includes a plurality of niche data 144. As used in this disclosure, "niche data 144" is data describing a niche, which data may be used to match a resource model 116 to a niche model 140. Niche data 144 may include without limitation one or more job requirements, which may be mandatory requirements such as a credential or license required to perform tasks corresponding to the niche and/or requirements that are preferred, desirable, or the like without being mandatory. Niche data 144 may describe one or more circumstances, benefits, perks, or the like of niche, such as a type of office and/or office space, presence or absence of parking and/or public transportation, a number of coworkers, job-site amenities, or the like. A subset of niche data 144 may include be a direct-match subset 156, as described in further detail below. Niche model 140 includes an output quantitative field 148. A "niche quantitative field," as used in this disclosure, is a quantitative field as described above that represents payment offered or potentially offered to a resource selected for niche, which may correspond to any example of merit quantitative fields 120 as described above.

Output quantitative field 148 may include a fuzzy set as described in further detail below; fuzzy set may include any form of fuzzy set suitable for use with regard to a fuzzy set representing a merit quantitative field 120. Output quantitative field 148 may include a bivalent set defined on an interval as described in further detail below; bivalent set may include any form of bivalent set suitable for use with regard to a bivalent set representing a merit quantitative field 120. Output quantitative field 148 may be generated using machine learning, in a similar manner to merit quantitative field 120, as described in further detail below.

Alternatively or additionally, and still referring to FIG. 1, niche model may be generated by using a feature learning and/or clustering algorithm to identify clusters of resources representing populations resources having similar characteristic profiles, classifying niche model 140 to a most similar cluster using any classification algorithm as described in this disclosure, and generating niche model 140 by replacing one, a plurality, or all characteristics of niche model 140 with characteristics of a centroid of that cluster.

With further reference to FIG. 1, a "feature learning algorithm," or "clustering algorithm," as used herein, is a machine-learning algorithm that identifies associations between elements of data in a data set, which may include without limitation a training data set, where particular outputs and/or inputs are not specified. For instance, and without limitation, a feature learning algorithm may detect co-occurrences of sets of physiological data, as defined above, with each other. As a non-limiting example, feature learning algorithm may detect co-occurrences of gene combinations, as defined above, with each other. Computing device may perform a feature learning algorithm by dividing physiological data from a given person into various subcombinations of such data to create physiological data sets as described above, and evaluate which physiological data sets tend to co-occur with which other physiological data sets; for instance, where physiological state data includes genetic sequences, computing device may divide each genetic sequence into individual genes and evaluate which individual genes and/or combinations thereof tend to co-occur with which other individual genes, and/or other physiological data. In an embodiment, first feature learning algorithm may perform clustering of data.

Continuing refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean, using, for instance behavioral training set as described above. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of gene combinations with multiple disease states, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

Still referring to FIG. 1, computing device may generate a k-means clustering algorithm receiving unclassified physiological state data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related physiological data, which may be provided with user cohort labels; this may, for instance, generate an initial set of user cohort labels from an initial set of user physiological data of a large number of users, and may also, upon subsequent iterations, identify new clusters to be provided new user cohort labels, to which additional user physiological data may be classified, or to which previously used user physiological data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids $c_i$ of centroids in set C. Unclassified data may be assigned to a cluster based on $argmin_{c_i \in C} dist(c_i, x)^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on $c_i=1/|S_i|\Sigma x_i \ni S_i^{xi}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected physiological data set. Degree of similarity index value may indicate how close a particular combination of genes, negative behaviors and/or negative behavioral propensities is to being classified by k-means algorithm to a particular cluster. K-means clustering algorithm may evaluate the distances of the combination of genes, negative behaviors and/or negative behavioral propensities to the k-number of clusters output by k-means clustering algorithm. Short distances between a set of physiological data and a cluster may indicate a higher degree of similarity between the set of physiological data and a particular cluster. Longer distances between a set of physiological behavior and a cluster may indicate a lower degree of similarity between a physiological data set and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between a physiological data set and the data entry cluster. Alternatively or additionally k-means clustering algorithm may select a plurality of clusters having low degree of similarity index values to physiological data sets, indicative of greater degrees of similarity. Degree of similarity index values may be compared to a threshold number indicating a minimal degree of relatedness suitable for inclusion of a set of physiological data in a cluster, where degree of similarity indices falling under the threshold number may be included as indicative of high degrees of relatedness. The above-described illustration of feature learning using k-means clustering is included for illustrative purposes only, and should not be construed as limiting potential implementation of feature learning algorithms; persons skilled in the art, upon reviewing the entirety of this disclosure, will be aware of various additional or alternative feature learning approaches that may be used consistently with this disclosure. Clustering and/or identification of cluster centroids may alternatively or additionally be performed using particle swarm optimization, ant-colony optimization, neural network-based clustering algorithms, genetic algorithms, or any other suitable process that may occur to a person skilled in the art upon reviewing the entirety of this disclosure.

With continued reference to FIG. 1, computing device 104 is configured to combine niche model 140 with at least a selected resource model 116 corresponding to a selected resource of the plurality of resources. "Combination," as used herein, refers to matching and/or associating niche model 140 with at least a selected resource model 116, for instance by identifying at least a resource associated with at least a selected resource model 116 that is suitable for filling, or performing tasks associate with, niche. Combination may be accomplished, without limitation, by generating and/or recording an element of data indicating that resource represented by resource model 116 has been selected for a niche represented by niche model 140. Such association may be recorded by linking resource model 116 or an identifying data of resource model 116 to niche model 140 and/or identifying data of niche model 140 using a data record, textual string, inclusion of one data structure in the other, and/or inclusion of both in a shared data structure. Computing device 104 may combine niche model 140 with at least a selected resource model 116 by classifying the output quantitative field 148 to at least a selected merit quantitative field 120 of the at least a selected resource model 116. "Classification" or "classifying," as used herein is defined as any process that identifies two values as matching one another. Classification may include, without limitation, numerical equivalency and/or comparison; for instance, classification may include determination that a merit quantitative field 120 represented by a single number is less than or equal to a single number representing an output quantitative field 148, and/or is within some threshold range above and/or below such single number representing an output quantitative field 148. As a further non-limiting example, classification may include identification of a degree of match between a fuzzy set and/or single value representing a merit quantitative field 120 and a fuzzy set and/or single number representing an output quantitative field 148, which degree of match may be compared to a threshold as described in further detail below. Classification may alternatively or additionally be performed using a classification machine-learning process and/or a classifier, as described in further detail below, where classifier may classify based on output quantitative field 148 and merit quantitative field 120 as well as one or more additional fields of niche model 140 and resource model 116. Computing device 104 is configured to combine niche model 140 with at least a selected resource by classifying at least a niche datum of plurality of niche data 144 to at least a datum of plurality of resource data 112; such classification may be performed according to any process described above, including without limitation using comparisons of fuzzy sets and/or bivalent sets defined on a range, which sets may represent resource data 112, niche data 144, or the like.

In an embodiment, and with further reference to FIG. 1, computing device 104 may combine the niche model 140 to the at least a selected resource model 116 using a classifying machine-learning process 152. A "classifying machine-learning process 152," as used in this disclosure, is a machine-learning process, as defined in further detail below, which produces and/or comprises a classifier. A "classifier," as used in this disclosure is a machine-learning model, such as a mathematical model, neural net, or program generated by a classification machine-learning process, which may include a machine learning algorithm as described in further detail below, known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a process whereby a computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B) = P(B/A) P(A) \div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. Classification may alternatively or additionally be performed using neural networks and/or deep learning networks.

Still referring to FIG. 1, computing device 104 may be configured to combine the niche model 140 to the at least a selected resource model 116 by combining the niche model 140 to a single resource model 116 corresponding to a single resource of the plurality of resources. In other words, computing device 104 may automatically select a single resource to be hired for or otherwise fill niche, who may be automatically informed via a corresponding resource client device 108a-n of selection. Combining niche model 140 to single resource model 116 may include defining a direct-match subset 156 of the plurality of niche elements. A "direct-match subset 156," as used in this disclosure, is a subset of niche data 144 and/or output quantitative field 148 that, if positively matched and/or classified to corresponding resource data 112 elements and/or merit quantitative field 120 of a single resource will result in selection of that single resource for immediate association with niche. Computing device 104 may classify a set of resource data 112 of plurality of resource data 112 corresponding to single resource model 116 to direct-match subset 156, where classification may be performed according to any form of classification as described in this disclosure, including without limitation numerical comparison, comparison of bivalent and/or fuzzy sets, and/or classification using a classifier implemented as described herein. Computing device 104 may classify merit quantitative field 120 of single resource model 116 to output quantitative field 148, where classification may be performed according to any form of classification as described in this disclosure.

With continued reference to FIG. 1, computing device 104 is configured to provide an indication of the at least a selected resource model 116 to a client device of the niche model 140. Indication may be provided using any suitable form of electronic communication, including without limitation push notifications, text messaging, instant messaging, electronic mail ("email") or the like. One or more messages may be generated using templates, such as email templates; templates may have defined fields in a textual body, and computing device 104 may replace such defined fields with niche data 144, resource data 112, and/or other data retrieved and/or generated in connection with methods or method steps described in this disclosure.

Figure 2:
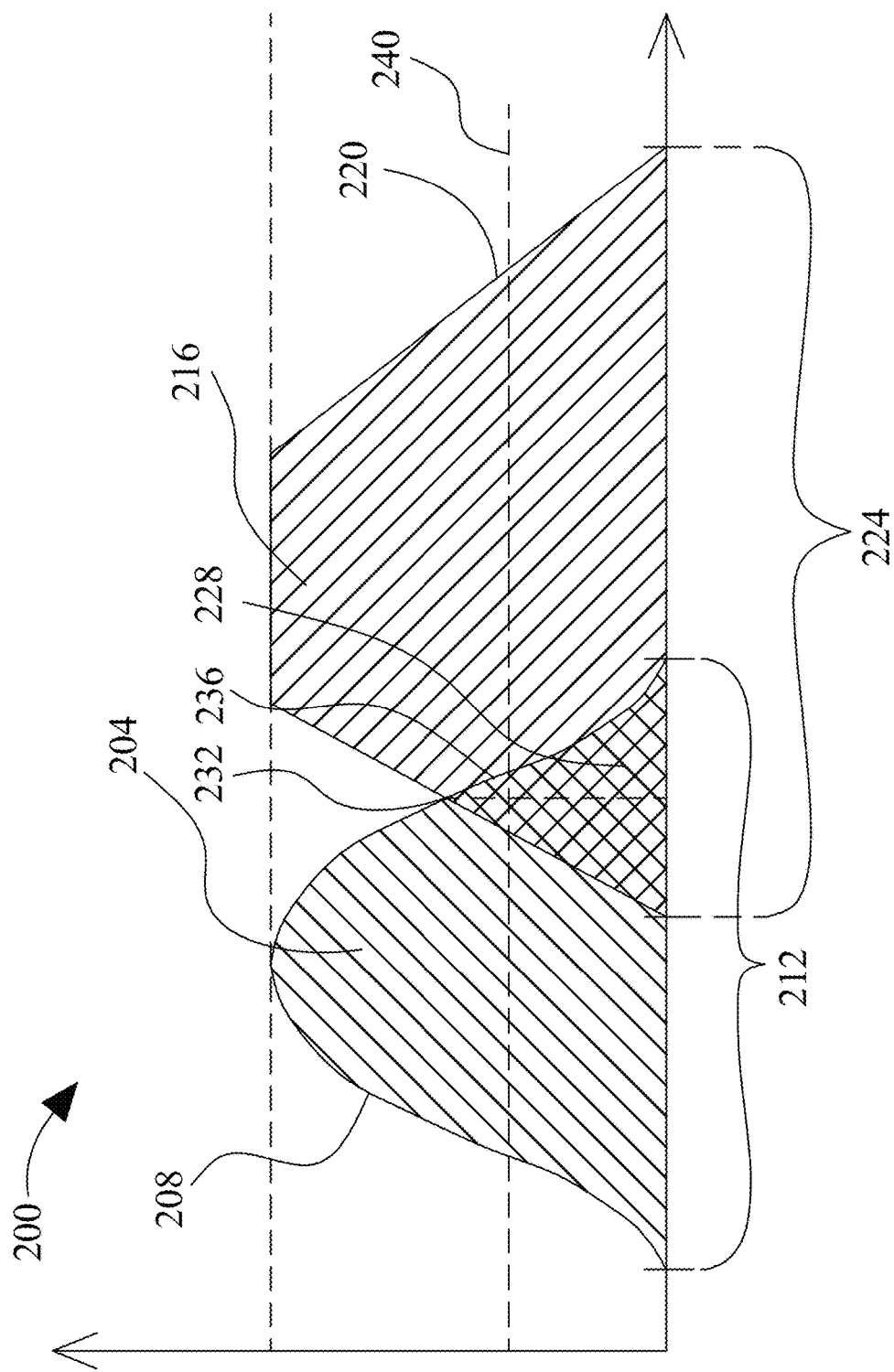
FIG. 2 is a block diagram illustrating exemplary embodiments of fuzzy sets.

Referring now to FIG. 2, an exemplary embodiment of fuzzy set comparison 200 is illustrated. A first fuzzy set 204 may be represented, without limitation, according to a first membership function 208 representing a probability that an input falling on a first range of values 212 is a member of the first fuzzy set 204, where the first membership function 208 has values on a range of probabilities such as without limitation the interval [0,1], and an area beneath the first membership function 208 may represent a set of values within first fuzzy set 204. Although first range of values 212 is illustrated for clarity in this exemplary depiction as a range on a single number line or axis, first range of values 212 may be defined on two or more dimensions, representing, for instance, a Cartesian product between a plurality of ranges, curves, axes, spaces, dimensions, or the like. First membership function 208 may include any suitable function mapping first range 212 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 204 may represent any value or combination of values as described above, including merit quantitative field 120, an output quantitative field 148, any resource datum, any niche datum, and/or any combination of the above. A second fuzzy set 216, which may represent any value which may be represented by first fuzzy set 204, may be defined by a second membership function 220 on a second range 224; second range 224 may be identical and/or overlap with first range 212 and/or may be combined with first range via Cartesian product or the like to generate a mapping permitting evaluation overlap of first fuzzy set 204 and second fuzzy set 216. Where first fuzzy set 204 and second fuzzy set 216 have a region 228 that overlaps, first membership function 208 and second membership function 220 may intersect at a point 232 representing a probability, as defined on probability interval, of a match between first fuzzy set 204 and second fuzzy set 216. Alternatively or additionally, a single value of first and/or second fuzzy set may be located at a locus 236 on first range 212 and/or second range 224, where a probability of membership may be taken by evaluation of first membership function 208 and/or second membership function 220 at that range point. A probability at 228 and/or 232 may be compared to a threshold 240 to determine whether a positive match is indicated. Threshold 240 may, in a non-limiting example, represent a degree of match between first fuzzy set 204 and second fuzzy set 216, and/or single values therein with each other or with either set, which is sufficient for purposes of the matching process; for instance, threshold may indicate a sufficient degree of overlap between merit quantitative field 120 and output quantitative field 148 for combination to occur as described above. There may be multiple thresholds; for instance, a second threshold may indicate a sufficient match for purposes of a direct-match subset 156 as described in this disclosure. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if two resource models 116 have fuzzy sets matching a niche model 140 fuzzy set by having a degree of overlap exceeding a threshold, computing device 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple resource models 116 may be presented to a user of a niche client device 136a-m in order of ranking.

Figure 3:
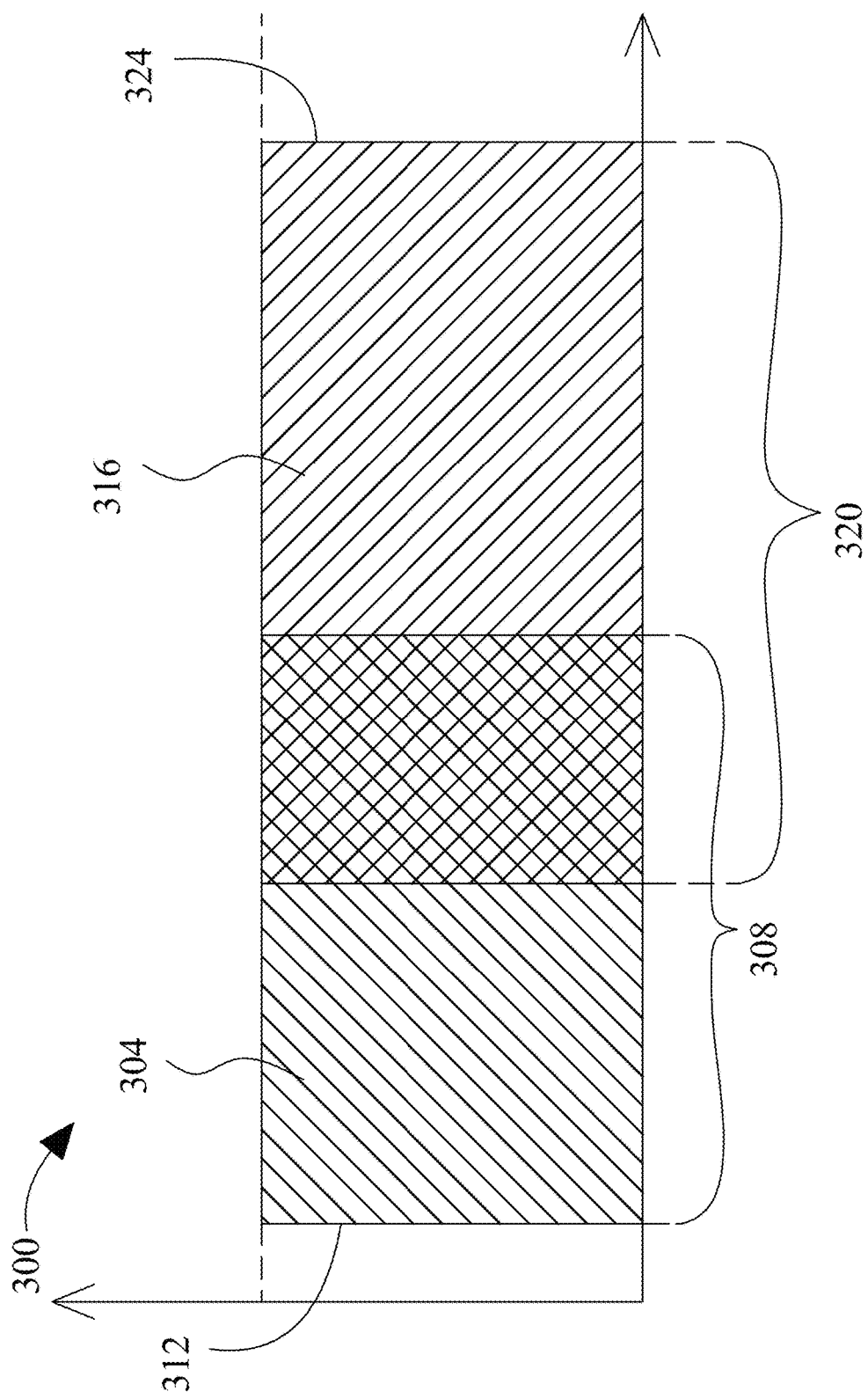
FIG. 3 is a block diagram illustrating exemplary embodiments of bivalent sets.

Referring now to FIG. 3, an exemplary embodiment of comparison of bivalent sets on ranges is illustrated. A first bivalent set 304 may be defined on a first range 308, which may have any form suitable for use as a first range 212 for a fuzzy set as described above. In an embodiment, first bivalent set 304 may be defined according to a first characteristic function 312, which may include, without limitation, a step function having output values on a probability interval such as [0,1] or the like; step function may have an output representing 100% or probability of 1 for values falling on first range 308 and zero or a representation of zero probability for values not on first range 308. A second bivalent set 316 may be defined on a second range 320, which may include any range suitable for use as first range 308. Second bivalent set may be defined by a second characteristic function 324, which may include any function suitable for use as first characteristic function 312. In an embodiment a match between first bivalent set 308 and second bivalent set 320 may be established where first range 308 intersects second range 320, and/or where first characteristic function 312 and second characteristic function 324 share at least one point in first range 308 and second range 316 at which both first characteristic function 312 and second characteristic function 324 are non-zero.

Figure 4:
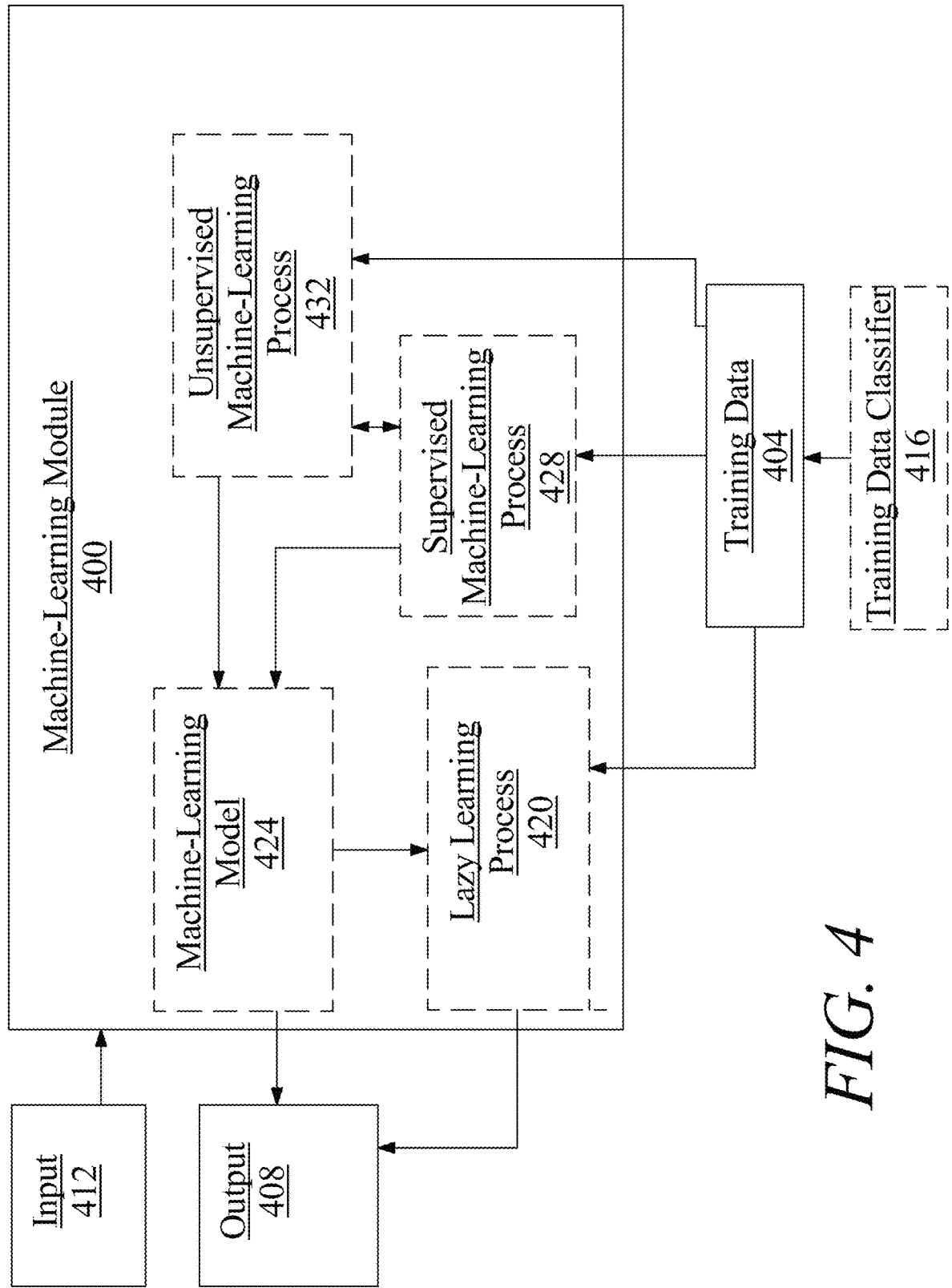
FIG. 4 is a block diagram illustrating an exemplary embodiment of a machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device 104/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a process whereby a computing device 104 and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to one or more categories or sets of categories of training data, such as geographical location, age, ethnicity, national origin, nation or region in which primary, secondary, and/or university education took place, work history, or any category formed based on similarity with regard to one or more data fields, elements, categories, and/or examples described in this disclosure.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Further referring to FIG. 4, a machine-learning model as described above may be used to determine merit quantitative field 120. In an embodiment, merit quantitative field machine-learning model 124 may be retrieved from a database and/or data store, which may be any database as described in this disclosure. In an embodiment, there may be more than one merit quantitative field machine-learning model 124; for instance, a plurality of such models may have been trained using training data classified according to one or more categories as described above. Merit quantitative field machine-learning model 124 may be retrieved, for instance, using a query listing values, corresponding to one or more categories according to which training data and/or models have been classified, of resource data 112 corresponding to a particular resource for which merit quantitative field 120 is to be generated.

Alternatively or additionally, computing device 104 may train merit quantitative field machine-learning model 124 using training data. Training data may include a plurality of entries, each entry of which may include at least a resource datum and at least a correlated merit quantitative field 120 datum, which may include a merit quantitative field 120 and/or a numerical or other value that may be used to calculate a merit quantitative field 120. Training data may be generated by collection of merit quantitative values that were granted and/or paid to past resources and resource data 112 of such resources, thus establishing real-world correlations according to which to train merit quantitative field machine-learning model 124. Computing device 104 may train merit quantitative field machine-learning model 124 as a function of training data and any machine-learning process as described above. Machine-learning process may alternatively or additionally tune one or more elements of merit quantitative field 120, such as a location of a centroid, range, area coverage, and/or one or more coefficients of a member function of a fuzzy set, a location of a centroid, range, area coverage, and/or one or more coefficients of a characteristic function of a bivalent set.

Still referring to FIG. 4, computing device 104 may be configured to tune a biasing element 128 as a function of a plurality of distributed factors 132 and/or other data. For instance, training data correlating distributed factors 132 and/or other data to biasing element 128 values may be received based on real-world examples of biasing elements 128 and/or on inputs of users directly establishing biasing elements 128, which may be correlated with distributed factors 132 and/or resource data 112. A machine-learning model may be tuned with this training data as a function of any machine-learning process described above; biasing element 128 may then be generated as a function of the machine-learning model and distributed factors 132 and/or resource data 112 associated with resource for which biasing element 128 is being determined. Alternatively, computing device 104 may retrieve and/or receive a machine-learning model as described above from a database, from another device, and/or as a function of a classifier as described above.

Continuing to refer to FIG. 4, computing device 104 may generate output quantitative field 148 using machine learning, in a similar manner to merit quantitative field 120; that is, training data correlating output quantitative field 148 data to niche data 144 may be received in the form of real-world examples of niche data 144 and corresponding output quantitative fields 148 that were utilized and/or paid to resources in past real-world examples. Training data may be used to train a niche quantitative field machine-learning model. Niche quantitative field may be determined and/or calculated as a function of niche quantitative field machine-learning model and one or more niche data 144. Alternatively or additionally, niche quantitative field machine-learning model may tune one or more elements of merit quantitative field 120, such as a location of a centroid, range, area coverage, and/or one or more coefficients of a member function of a fuzzy set, a location of a centroid, range, area coverage, and/or one or more coefficients of a characteristic function of a bivalent set.

As described above, and further referring to FIG. 4, computing device 104 may combine niche model 140 with at least a selected resource model 116 by classifying the output quantitative field 148 to at least a selected merit quantitative field 120 of the at least a selected resource model 116. A classifier to perform this process may be trained using classification training data, which may include training examples correlating niche models 140 with resource models 116, for instance as recorded by computing device 104 and/or users from real-world of examples, e.g., of resources hired and/or successfully hired for niches. Classifier may be trained using classification training data and any suitable classification and/or machine-learning algorithm as described above.

Still referring to FIG. 4, computing device 104 and/or another device in system may use a machine-learning process and/or model as described above to identify elements of a direct-match subset 156; for instance, training data may be input by users and/or automated processes describing combinations of resource data 112 and/or merit quantitative field 120 data with niche data 144 and/or output quantitative data, with a cost function and/or fitness function rating performance of a resource in a niche, where outcomes may be graded from 0 to 100% or the like. A model may be trained to identify a set of resource data 112 and/or merit quantitative field 120 data that for a given set of niche data 144 and/or output quantifier data that results in an outcome having a grade and/or rating above a threshold level; such combinations may be used to create new direct-match subsets 156, which may be used as described above.

Further referring to FIG. 4, computing device 104 may use machine-learning to determine a threshold to represent a degree of match between a first fuzzy set 204 and a second fuzzy set 216, and/or single values therein with each other or with either set, which is sufficient for purposes of determining that the two are matched for combination of niche model 140 to resource model 116, for instance by indicating a sufficient degree of overlap between merit quantitative field 120 and output quantitative field 148 for combination to occur as described above. Training data may include without limitation training data correlating degree of match of resource data 112 and/or merit quantitative field 120 to niche data 144 and/or output quantitative field 148, with outcome data as described above; a machine-learning model and/or process may be used to calculate a degree of match for a given pairing of resource data 112 and/or merit quantitative field 120 with niche data 144 and/or output quantitative field 148 to achieve some threshold grade, which may be set, for instance by a user. Machine-learning process or model may determine an acceptable threshold level of match between fuzzy sets as a result.

Figure 5:
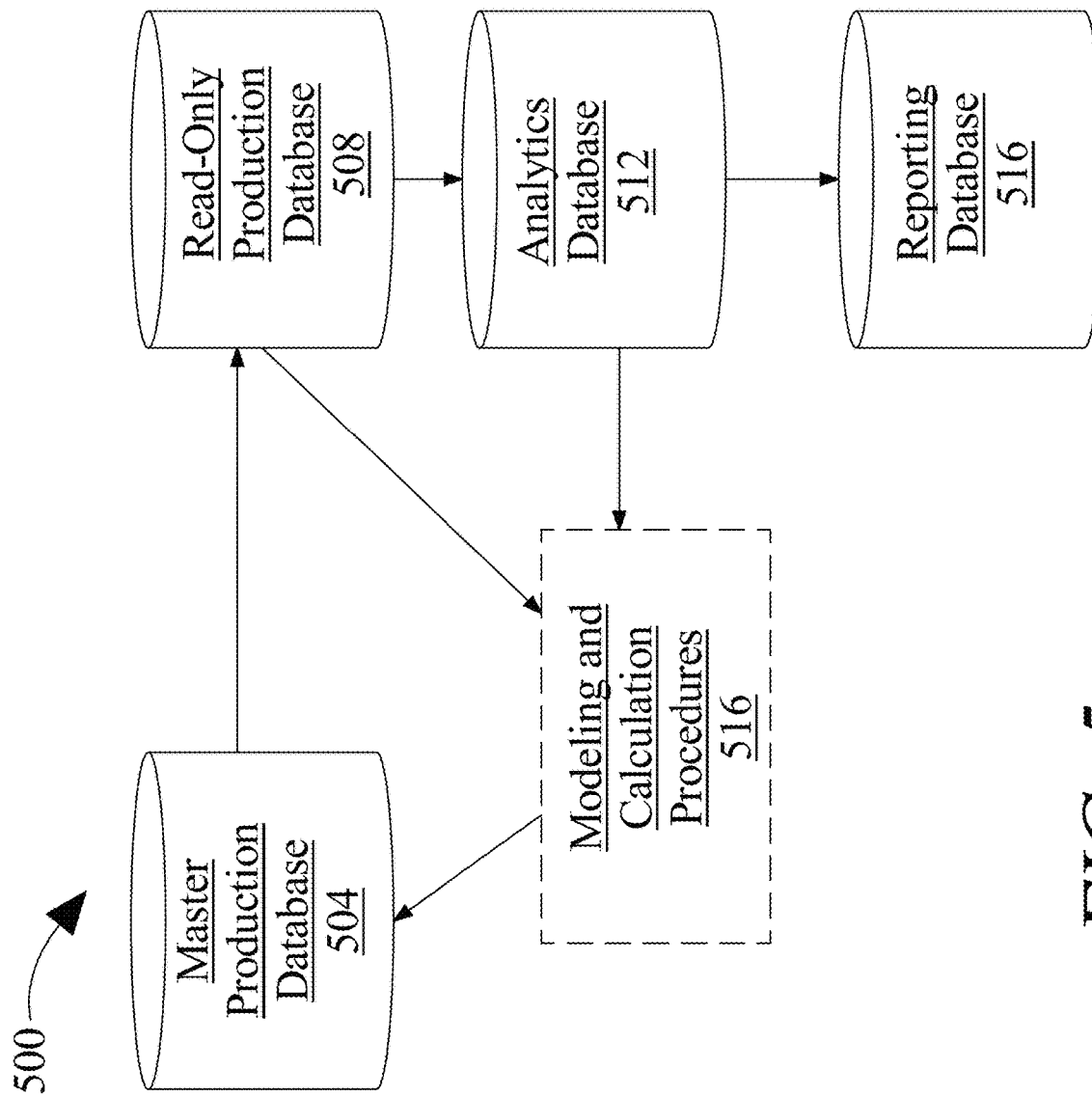
FIG. 5 is a block diagram illustrating an exemplary embodiment of a data architecture.

Referring now to FIG. 5, an exemplary database architecture 500 for system 100 is illustrated. Database architecture 500 may include a master production database 504. Master production database 504 may be implemented, without limitation, as a relational master production database 504, a key-value retrieval master production database 504 such as a NOSQL master production database 504, or any other format or structure for use as a master production database 504 that a person skilled in the art would recognize as suitable upon review of the entirety of this disclosure. Master production database 504 may alternatively or additionally be implemented using a distributed data storage protocol and/or data structure, such as a distributed hash table or the like. Master production database 504 may include a plurality of data entries and/or records as described above. Data entries in a master production database 504 may be flagged with or linked to one or more additional elements of information, which may be reflected in data entry cells and/or in linked tables such as tables related by one or more indices in a relational master production database 504. Persons skilled in the art, upon reviewing the entirety of this disclosure, will be aware of various ways in which data entries in a master production database 504 may store, retrieve, organize, and/or reflect data and/or records as used herein, as well as categories and/or populations of data consistently with this disclosure. Master production database 504 may be used to store data used by system 100 as described above, including without limitation resource data 112, merit quantitative fields 120, niche data 144, output quantitative fields 148, combinations of resources and niches, and/or other data concerning and/or describing interactions between niches, resources, and/or system 100, which may include any such data as described in this disclosure. Master production database 504 may be used for retrieval of data to support methods as described in this disclosure, including without limitation methods of classifying resources to niches; for instance, and without limitation, data may be retrieved from master production database 504 for performance of processes and/or process steps as described in this disclosure, including without limitation generation of merit quantitative field 120 and/or niche quantitative field, generation of resource model 116, generation of niche model 140, combination of niche model 140 and resource model 116, transmission of information, templates for transmission of information, or the like.

In an embodiment, and still referring to FIG. 5, master production database 504 may be isolated from some processes and/or modules of system 100 to preserve security and/or data integrity. Master production database 504 may be mirrored to a read-only production database 508 from which data may be retrieved for integration with third-party services and/or generation of scheduled notifications such as job digest emails, and/or job reminder emails and/or push notifications to niches and/or resources. Persons skilled in the art, upon reviewing the entirety of this disclosure, will be aware of various alternative or additional ways in which data retrieved from read-only production database 508 may be used by system 100 for purposes described in this disclosure.

Further referring to FIG. 5, an analytics database 512 may be used to store outputs of calculations regarding statistics and/or other numerical information describing populations of niches and/or resources, outcomes and/or trends from past iterations of methods. Data from analytics database 512 may be used to generate training data or statistics used for matching, classification, or the like.

With continued reference to FIG. 5, a reporting database 516 may be used to generate dashboards for analytical professionals operating system 100, to generate reports describing one or more trends, elements of data, or the like as generated in and/or for one or more iterations of methods described in this disclosure or the like.

In an embodiment, and still referring to FIG. 5, modeling and calculation procedures 516, such as procedures and/or process steps described in this disclosure, and/or to export data to one or more third parties. The above-provided database architecture is provided for exemplary purposes only, and persons skilled in the art, upon reviewing the entirety of this disclosure, will be aware of various alternative or additional configurations that may be used consistently with this disclosure.

Figure 6:
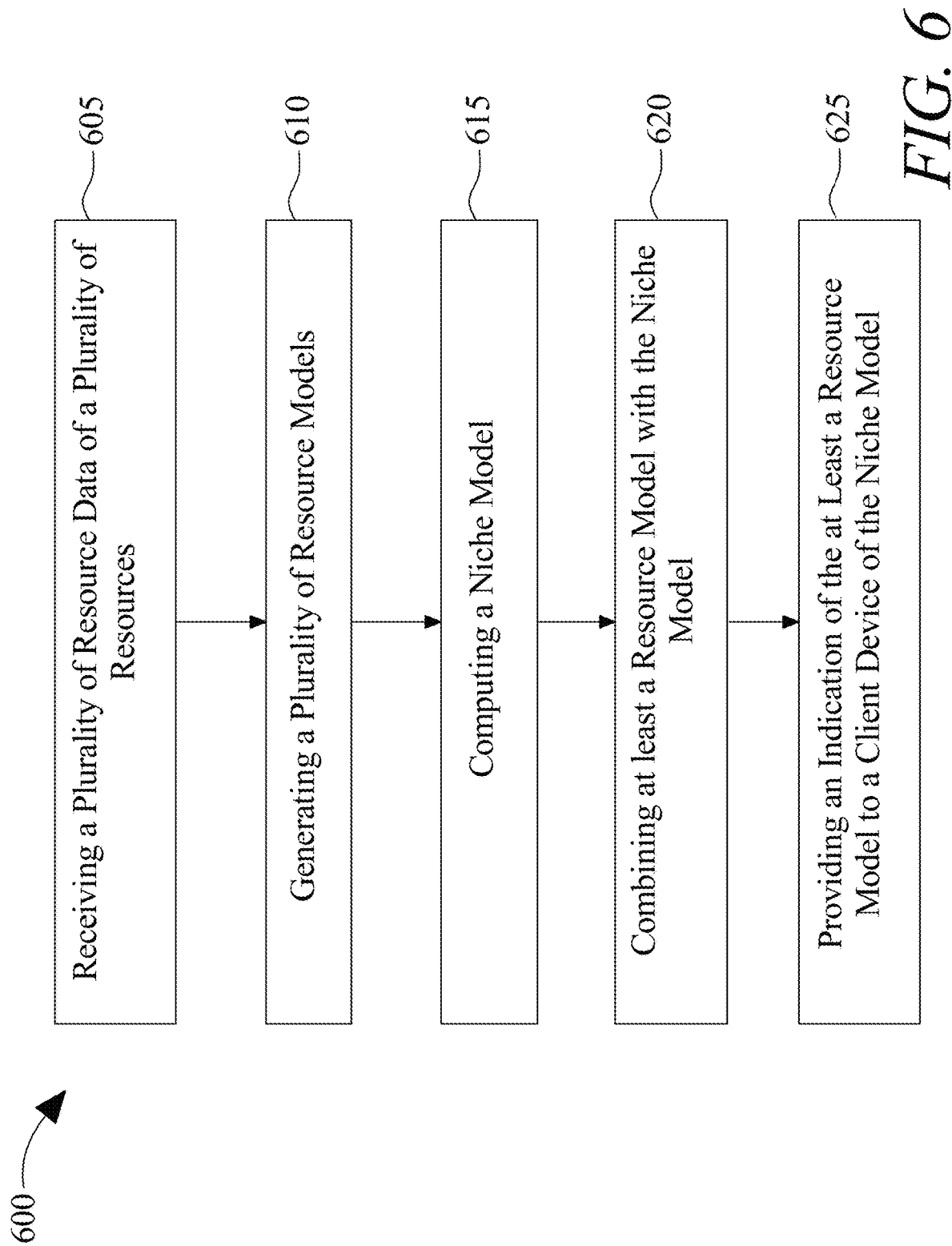
FIG. 6 is a flow diagram illustrating an exemplary embodiment of a method of classifying resources to niche models.

Referring now to FIG. 6, an exemplary embodiment of a method 600 of classifying resource models 116 to niche models 140 is illustrated. At step 605, a computing device 104 receives a plurality of resource data 112 corresponding to a plurality of resources; this may be implemented, without limitation, as described above in reference to FIGS. 1-5. Resource data 112 may include, without limitation, a name or other identifying data of resource, geographical location of a residence and/or current place of work of resource, a range of areas in which resource can work, which may include a radius around the residence of resource, a number of years of experience of the resource, dates and/or times at which resource is available to perform work, data describing work experience such as without limitation types of previous work performed, quality of performance, reviews and/or references, positions previously occupied, durations of gigs and/or positions occupied in the past, or the like, educational attainments such as subjects studied, degrees earned, fields of study, institutions such as universities, trade schools, or the like, professional credentials of resource such as without limitation licenses, data concerning completion of internship, residency requirements, or the like, completion of continuing education requirements, disciplinary records before licensing boards, personal preferences, professional skills, or any other resource data 112 that may occur to persons skilled in the art upon reviewing the entirety of this disclosure. Resource data 112 may include information concerning allergies, disabilities, or other health concerns of resource. Resource data 112 may include information describing equipment and/or computer programs which resource has been trained to use and/or which resource has work experience using. Resource data 112 may include names or other identifying information of one or more persons resource has worked with in the past. Resource data 112 may include disciplinary records, credit history, criminal background check information, or the like.

At step 610, and still referring to FIG. 6, computing device 104 generates a plurality of resource models 116; this may be implemented, without limitation, as described above in reference to FIGS. 1-5. Generating plurality of resource models 116 may include deriving, for each resource and as a function of the plurality of resource data 112, a merit quantitative field 120 and generating a resource model 116 corresponding to the resource as a function of the plurality of resource data 112 and the merit quantitative field 120. Derivation of merit quantitative field 120 may include, as an illustrative example, implementation of dynamic suggested pricing system for suggesting appropriate job rates to resources applying for a niche; derivation may depend, as a non-limiting example, on the personnel (experience, profile completion etc.) and the rates of the previous jobs completed in the city/zip code of the job. Derivation may include, without limitation any process described above, and/or may include recording one or more entries provided by a resource; for instance, resource may choose a desired merit quantitative field 120 by moving one or more sliders on a mobile application and/or a web application. Slider may use color and text to notify personnel if a desired merit quantitative field 120 is appropriate or not, for instance by comparison to a merit quantitative field 120 generated as described above. For instance, if a slider value is within a given range from the suggested rate and/or if the chosen desired rate is lower than the suggested rate, the slider may be colored green, if selected merit quantitative field 120 is slightly higher than a generated merit quantitative field 120, it may be colored yellow and if the desired rate is much higher than the suggested rate the slider may be colored red along with the warning text that the personnel is unlikely to get hired for the job with the chosen desired rate.

As a further example of merit quantitative value derivation, a base rate may be calculated; base rate may be calculated using any process described above. For instance, base rate may be calculated for each pair of a zip code of work location and/or license type of resource desired and/or for each pair of a city of work location and/or license type. Base rate calculation may be a scheduled task performed nightly by a dedicated actor. City/license type and zip/license type tasks may be separate. In an embodiment, calculation may be performed only for zip code areas and cities (which may be referred to collectively herein as "job areas") that have had completed engagements in the past in order to avoid unneeded calculations. In an embodiment, for each job areas up to 10 previous engagements may be selected and a rate of these engagements may be appended to a sum; these rates may be divided with a weight coefficient used for their original calculation in order to decouple them from parameters of personnel and office that participated in an engagement. This sum may then be divided by ten to obtain a base rate to be used for a particular job area/license type combination. If a job area does not have engagements default base rate may be used, which may be stored in an application configuration. If a job area has less than ten engagements a standard sum calculation may be performed for existing engagements, and virtual engagement rates may be added to a sum until there are ten engagements, after which the sum may be divided by ten.

These virtual engagements may have their rate set to a default rate for a license type, which may be stored in application configuration.

A calculated rate may be stored in the database for each job area/license type pair.

In an embodiment, and still referring to FIG. 6, when a job match is created and/or one or more method steps are being performed, a weight coefficient may be calculated for that job match that may determine suggested rate scaling based on personnel and client properties. A default value may have a weight of 1. Depending on properties of resource and/or niche, a coefficient may either increased or decreased by a value that is defined in an application configuration. These properties and values may be given, without limitation, as illustrated for exemplary purposes in the table below:

| base weight | | 1 |
|---|---|---|
| Years of experience | 0-1 years | −0.1 |
| | 10+ years | 0.06 |
| Star rating | star rating < 4 | −0.05 |
| | star rating >= 4 | 0.03 |
| Votes | votes > 5 | 0.02 |
| Parking available | not or only paid | 0.05 |
| Job on same day | same day | 0.06 |
| Personnel profile picture | missing profile picture | −0.1 |

After weight coefficients are calculated for a job match, base rate may be fetched (from a database as described above) for a job zip code and license type combination of the job. If there is no data for the zip code license type combination of the job, a base rate may be fetched (from a database) for a license type and city combination instead. If there is no data for a job area, a default rate may be used from an application configuration. Once calculated a suggested rate may be stored in a job match table as a column of an appropriate job match.

As a non-limiting example, and still referring to FIG. 6, merit quantitative field 120 may include a fuzzy set. As a further non-limiting example, merit quantitative field 120 may include a bivalent set defined on an interval. Deriving merit quantitative field 120 may include, in a non-limiting example, providing a merit quantitative field machine-learning model 124 and deriving the merit quantitative field 120 as a function of the plurality of resource data 112 and the machine-learning model. Generating merit quantitative field 120 may include generating a biasing element 128 and generating the merit quantitative field 120 as a function of the biasing element 128, in a non-limiting example. Biasing element 128 may be tuned as a function of a plurality of distributed factors 132, for instance as described above in reference to FIGS. 1-5. In an embodiment, biasing element 128 may include a social rating, which may depend upon inputs from one or more users of system 100 concerning timeliness of arrival at jobs, including arrival with sufficient lead time, level of professionalism of dress, including for instance scrubs for medical professionals, good grooming, appropriate footwear, refraining from perfumes and/or colognes, or the like, professional comportment, particularly in front of clients, patients, or the like, clock management, appropriately limited cell phone use, appropriate interaction according to preferences of existing staff, and remembering to thank supervisors and/or other people at niche At step 615, and with continued reference to FIG. 6, computing device 104 computes a niche model 140; this may be implemented, without limitation, as described above in reference to FIGS. 1-5. For instance, niche model 140 may include a plurality of niche data 144 and an output quantitative field 148. In a non-limiting example, output quantitative field 148 may include a fuzzy set. In a further non-limiting example, output quantitative field 148 may include a bivalent set defined on an interval. Niche data 144 may include, without limitation, location, such as an address or other, geographical location of one or more work sites for niche. Niche data 144 may include an identity of an institution, staffing company, or other entity at and/or to which resource may report when filling niche and/or performing tasks called for by niche. Niche data 144 may include identities of one or more persons who will be working with resource, including without limitation supervisors, teammates, people who will be reporting to resource, or the like. Niche data 144 may include equipment to be used during performance of tasks for niche. Niche data 144 may include computer programs to be operated for performance of niche. Niche data 144 may include hours to be worked for niche, including daily hours, weekly hours, a total number of hours, or the like, days on which work is to be performed, shifts to be covered, or other logistical matters. Niche data 144 may include a role to be filled, one or more tasks to be performed, license and/or certification requirements, a desired level of experience, or the like. Niche data 144 may include a number of people needed or permitted to be utilized for niche. Niche data 144 may include information about the nature and/or specifics of patients and/or clientele. Niche data 144 may include Information about hazards, allergens, or the like present at a worksite At step 620, and still referring to FIG. 6, computing device 104 combines niche model 140 with at least a selected resource model 116 corresponding to a selected resource of plurality of resources; this may be implemented, without limitation, as described above in reference to FIGS. 1-5. Combining may include classifying output quantitative field 148 to at least a selected merit quantitative field 120 of at least a selected resource model 116. Combining may include classifying at least a niche datum of plurality of niche data 144 to at least a datum of plurality of resource data 112. Combining niche model 140 to at least a selected resource model 116 may include combining the niche model 140 to the at least a selected resource model 116 using a classifying machine-learning process 152. Combining niche model 140 with at least a selected resource model 116 may include combining the niche model 140 to a single resource model 116 corresponding to a single resource of plurality of resources. Combining niche model 140 to single resource model 116 may include defining a direct-match subset 156 of plurality of niche elements, classifying a set of resource data 112 of plurality of resource data 112 corresponding to the single resource model 116 to the direct-match subset 156, classifying merit quantitative field 120 of the single resource model 116 to output quantitative field 148, and combining the single resource model 116 to the niche model 140. As a non-limiting example, direct-match subset 156 may include output quantitative field 148, a cumulative social rating and/or rating by supervisors, former supervisors, current and/or former coworkers, or the like, and attendance records. In an embodiment, a match of direct-match subset 156 may result in an "auto hire" or "easy hire" process where professionals are instantly hired when they apply to a job post or other niche if they meet direct-match criteria; this process may be helpful for immediate temporary hiring situations, such as without limitation staff calling out sick with short notice, staff being called up or activated for military duty, sudden increases in work volume due to external events, or the like. Direct-match subset 156 may be used only for specific situations such as for "last minute" niches or jobs, including as a non-limiting example jobs posted within 24 hours of the scheduled start time.

At step 625, and with continued reference to FIG. 6, computing device 104 provides an indication of the at least a selected resource model 116 to a client device of the niche model 140; this may be implemented, without limitation, as described above in reference to FIGS. 1-5. Provision may be performed according to any process described above, including without limitation transmission of an email generated automatically or using a template. For instance, a template for an email for rehire of a resource to a niche may, as a non-limiting example, include the following:

"Hi *|officeName|*,

To ensure accurate payroll, please approve the hours and pay for

|fullNamePersonnel|* for the *|jobType|* job worked *|day|* at *|fullJobAddress|* within the next *|leftTime|* (excluding Sunday.) If hours are not approved within *|leftTime|*, we will automatically charge your office based on the professional's clocked in/out times, or the original scheduled hours if clock information is missing. We will also factor in an hour break for job durations lasting over 8 hours IF a break has not already been indicated.

Employee: *|fullNamePersonnel|*

Date: *|day|*

Job Type: *|jobType|*

Location: *|fullJobAddress|*

Hours: *|hours|*

Pay: $*|amount|*

Collection Account #: XXXX *|paymentMethod|*

You will automatically be charged the above amount if you do not approve the professional's hours within *|leftTime|*. If you have to make any modifications, you must do so within that timeframe.

Click to modify or approve hours

Would you like to work with *|fullNamePersonnel|* again?

Re-hire *|fullNamePersonnel|*

Please contact Support immediately if the email address that we have on file for you is going to change in the near future. As always, please do not hesitate to contact us with any questions. We're here to help.

Sincerely,"

Where *|officeName|*, *|fullNamePersonnel|*, *|jobType|*, *|day|*, *|fullJobAddress|*, *|leftTime|*, *|hours|*, *|amount|*, and *|paymentMethod|* may represent fields to be automatically filled and/or replaced with niche data 144 and/or resource data 112 such as, respectively, a name of an office for niche, a full name of a resource, a job type to be performed, a day on which job is to commence and/or be performed, a full address of a worksite, time left before the job is to commence, hours to be worked during the job, a wage or other form of compensation, and a payment source such as a credit card, bank, or the like. Provision may alternatively or additionally be performed using one or more push notifications, text messages, or other protocols for electronic communication. Niche client device and/or a user thereof may enter and/or transmit a selection of a resource from at least a resource provided to Niche client device.

Still referring to FIG. 6, system 100 may perform continuing analysis and/or communication with and/or concerning an operator of niche, with resource, or with other persons. For instance, and without limitation, system 100 may track location of resource as a function of time. Tracking may include detecting that resource has logged onto a workstation and/or has "punched in" and/or "punched out" to determine that resource is located at a worksite corresponding to niche. Tracking may include one or more geolocation and/or geofence determinations, where an approximate or exact geographical location of resource at a given time may be determined. Geographical location may be determined, without limitation, using a device operated by resource and one or satellite-based navigation facilities such as the Global Positioning System (GPS), GLONASS, Galileo, BeiDou, QZSS, IRNSS and/or NavIC. Geographical location may alternatively or additionally be detected using cell tower triangulation, signal contact and/or signal strength from one or more beacons, Wi-Fi devices, or other wireless signal sources, or the like. In an embodiment, geographical tracking of resource enables system 100 to determine when resource is at a job site, how likely resource is to arrive on time, and/or when resource is likely to arrive, when resource has finished working, or the like.

Still referring to FIG. 6, in an embodiment, system 100 may track whether a resource has canceled and/or failed to show up for work associated with niche. System 100 may automatically inactivate availability of resource for matching and/or combination processes as described above upon a cancelation by resource that is within a threshold limit of time prior to scheduled commencement of work, such as 24 hours or the like, which may be referred to as a "late cancelation." For instance, system 100 may temporarily suspend resource for a first such cancelation; two late cancelations may include removal of resource from system 100. As a further example resource may be inactivated if resource receives a rating and/or other distributed factor 132 from, for instance, a supervisor, which is below a threshold limit such as two stars in a five-star rating system or the like. In an embodiment, a first rating below a threshold limit may result in inactivation for a first period of time, while a second such rating within a given period of days may result in a second period of inactivation; second period may be longer than first period. As a non-limiting example, a resource receiving a first 2-star review or lower may be inactivated for 14 days, and receipt of a second within a period of 30 days may result in inactivation for 28 days. Where "strikes" are recorded based on performance and/or cancelation, system may remove one strike or all strikes after some period of time has passed, such as 90 days, without further incidents that would cause inactivation and/or banning.

With continued reference to FIG. 6, system 100 may automatically repost canceled jobs; that is, when a resource cancels a job at a niche to which resource has been classified, system 100 may repeat one or more processes and/or process steps to associate niche with another resource. System 100 may automatically repost a niche and/or reiterate upon completion of a time period in niche; that is, niche may be iteratively recreated and reposted. In an embodiment, a resource that has completed a first term of employment for niche may be automatically rematched to niche if one or more threshold conditions concerning resource and/or job performance by resource are satisfied. One or more threshold conditions may include, without limitation, a rating by one or more supervisors or coworkers above a certain level, or the like.

Still referring to FIG. 6, a system 100 may use characteristics of a previously matched and/or employed resource to find a resource for rehire and/or to replace previously matched resource. For instance, and without limitation, where a first resource was previously matched and/or employed, system 100 may classify a second resource to be matched to the first resource; second resource may then be hired. Alternatively, system 100 may use classification to select a second resource that is similar to first resource in some ways while different in others; for instance first resource may have a first set of characteristics that were optimal for the niche and a second set of resources that were not optimal for the niche. In an embodiment, a user such as a former supervisor and/or coworker may identify one more characteristics of first set of characteristics and/or second set of characteristics and enter such identification into system 100. In some embodiments, user may enter alternative values for second set of characteristics; second resource may be classified to first resource with second set replaced by user-entered characteristics. Alternatively or additionally, user may enter a degree of dissatisfaction with one or more characteristics in second set; system 100 may translate degree of dissatisfaction into a distance used in a clustering and/or classification algorithm as described above, and may identify resources and/or cluster centroids having characteristics of second set that are that distance from characteristics of second set relating to first resource. Identified centroids may be presented to user and/or values thereof corresponding to second set may be substituted into a resource model of first resource to generate a plurality of candidate models. A classification algorithm as described above may then match a candidate model to niche model 140, and second resource may be identified by classification of resource models to matching candidate model. Alternatively or additionally, values of second set may be replaced by random values in each candidate model and/or values for each cluster centroid identified using clustering algorithm as described above may be used for candidate values; cluster centroid values may be randomly selected. In an embodiment, random generation of candidate values and classification may be performed iteratively until a match exceeding a given threshold measure of similarity is achieved. Any of these processes may also be performed iteratively for initial matching by beginning with randomly selected values for one or more resource models and iteratively regenerating and reclassifying until a match exceeding a threshold measure of similarity is achieved.

It is to be noted that any one or more of the aspects and embodiments described herein may be conveniently implemented using one or more machines (e.g., one or more computing devices that are utilized as a user computing device 104 for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
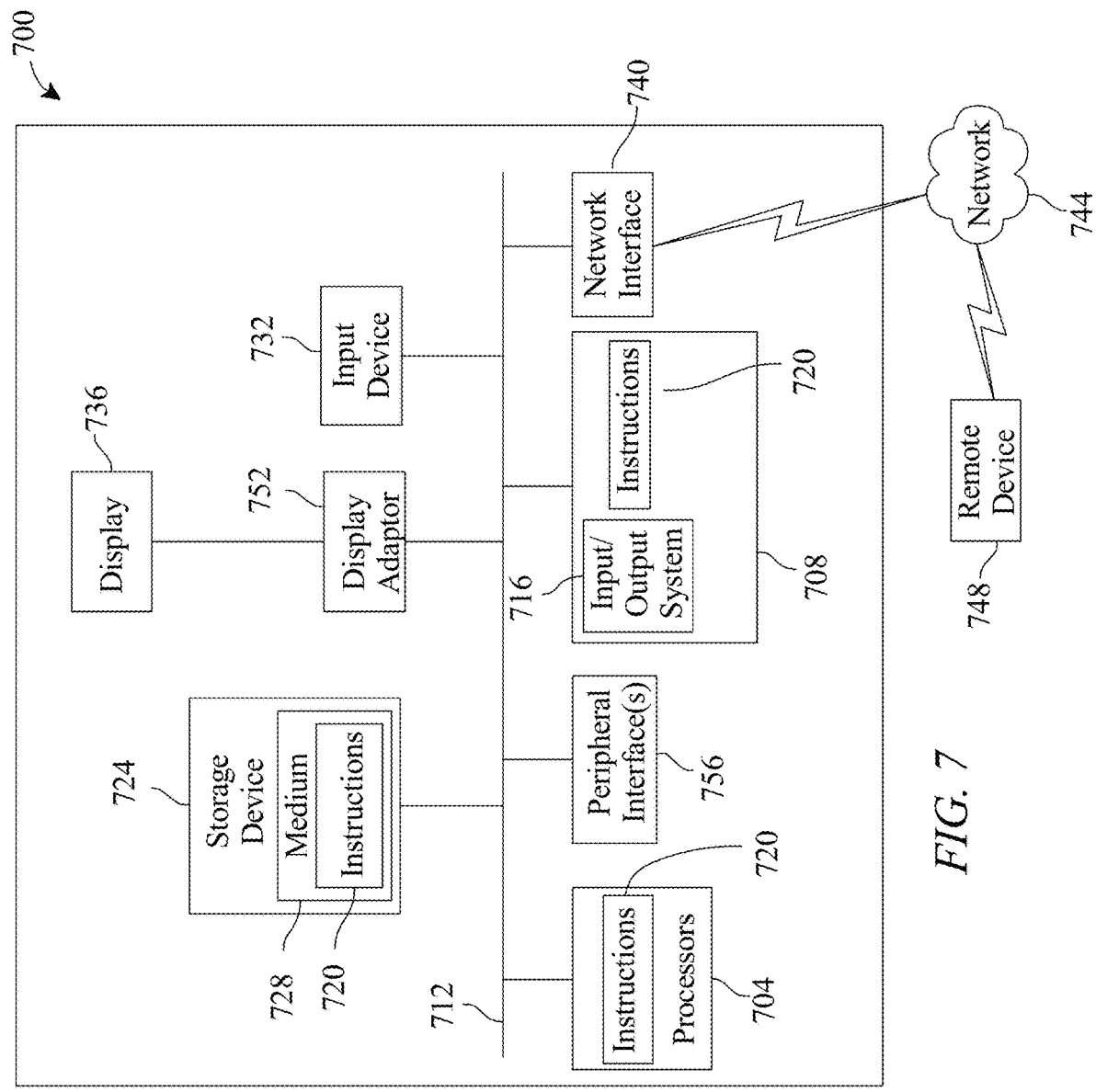
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for classifying resources to niche models, the system comprising:
   a computing device, wherein the computing device is configured to:
   receive a plurality of resource data corresponding to a plurality of resources;
   generate a plurality of resource models, wherein generating the plurality of resource models further comprises:
   receiving, for each resource, and from a plurality of resource client devices, a plurality of distributed factors, wherein each distributed factor includes a rating by a peer of the resource;

deriving, for each resource and as a function of the plurality of resource data, a merit quantitative field, wherein deriving the merit quantitative field further comprises:
  generating a training data, wherein the training data comprises at least a resource datum and at least a correlated merit quantitative field datum;
  training a merit quantitative field machine-learning model as a function of the training data; and
  deriving the merit quantitative field as a function of the plurality of resource data and the merit quantitative machine-learning model;
  generating a biasing element;
  tuning the biasing element as a function of the plurality of distributed factors; and
  modifying the merit quantitative field as a function of the biasing element;
generating a resource model corresponding to the resource as a function of the plurality of resource data and the merit quantitative field, wherein the plurality of resource models are displayed in order of ranking;
compute a niche model, wherein the niche model comprises:
  a plurality of niche data; and
  an output quantitative field, wherein the output quantitative field is generated as a function of a niche quantitative field machine-learning model, wherein generating the output quantitative field comprises:
    training the niche quantitative field machine-learning model using a training data comprising an output quantitative field data to a niche data; and
    generating the output quantitative field as a function of the niche quantitative field machine-learning model;
combine the niche model with at least a selected resource model corresponding to a selected resource of the plurality of resources, wherein combining further comprises:
  classifying the output quantitative field to at least a selected merit quantitative field of the at least a selected resource model; and
  classifying at least a niche datum of the plurality of niche data to at least a datum of the plurality of resource data;
provide an indication of the at least a selected resource model to a client device of the niche model, wherein providing the indication further comprises:
  automatically selecting a single resource; and
  automatically informing the single resource as a function of the client device;
receive an indication that the selected single resource is no longer available; and
select the a second resource of the plurality of resource models, wherein selecting the second resource further comprises:
  receiving, from a user associated with the niche, a set of characteristics of the selected single resource; and
  selecting the second resource using the set of characteristics and a classification algorithm.

2. The system of claim 1, wherein the merit quantitative field further comprises a fuzzy set.

3. The system of claim 1, wherein the merit quantitative field further comprises a bivalent set defined on an interval.

4. The system of claim 1, wherein the computing device is further configured to tune the biasing element as a function of a plurality of distributed factors, wherein the plurality of distributed factors comprises a quantitative datum received from the at least a niche client device and the tuning of the biasing element further comprises:
  receiving biasing training data correlating at least one of the plurality of distributed factors to the biasing element;
  tuning a biasing machine-learning using the biasing training data;
  generating the biasing element as a function of the biasing machine-learning model and the plurality of distributed factors.

5. The system of claim 1, wherein the output quantitative field further comprises a fuzzy set.

6. The system of claim 1, wherein the output quantitative field further comprises a bivalent set defined on an interval.

7. The system of claim 1, wherein the computing device is configured to combine the niche model to the at least a selected resource model using a classifying machine-learning process, wherein classifying machine-learning process is configured to:
  generate a classifier;
  train the classifier using a classification training data, wherein the classification training data comprises niche models correlated to resource models; and
  combine the niche model with the at least a resource model as a function of the classifier.

8. The system of claim 1, wherein the computing device is further configured to combine the niche model to the at least a selected resource model by combining the niche model to a single resource model corresponding to a single resource of the plurality of resources, wherein combining the niche model to the single resource model further comprises:
  defining a direct-match subset of the plurality of niche elements;
  classifying a set of resource data of the plurality of resource data corresponding to the single resource model to the direct-match subset;
  classifying the merit quantitative field of the single resource model to the output quantitative field; and
  combining the single resource model with the niche model.

9. The system of claim 1, wherein the set of characteristics further comprises a degree of dissatisfaction with the selected single resource.

10. The system of claim 9, wherein classifying further comprises:
  translating the degree of dissatisfaction into a distance according to distance metric used in a clustering algorithm;
  identifying at least a clustering centroid that having a matching distance from the first selected resource model; and
  identifying the second resource model using the identified at least a clustering centroid.

11. A method of classifying resource models to niche models, the method comprising:
  receiving, by a computing device, a plurality of resource data corresponding to a plurality of resources from at least a client device;
  generating, by the computing device, a plurality of resource models, wherein generating the plurality of resource models further comprises:
    receiving, for each resource, and from a plurality of resource client devices, a plurality of distributed factors, wherein each distributed factor includes a rating by a peer of the resource;

deriving, for each resource and as a function of the plurality of resource data, a merit quantitative field, wherein deriving the merit quantitative field further comprises:
  generating a training data, wherein the training data comprises at least a resource datum and at least a correlated merit quantitative field datum;
  training a merit quantitative field machine-learning model as a function of the training data; and
  deriving the merit quantitative field as a function of the plurality of resource data and the merit quantitative machine-learning model:
  generating the biasing element;
  tuning the biasing element as a function of the plurality of distributed factors; and
  modifying the merit quantitative field as a function of the biasing element; and
generating a resource model corresponding to the resource as a function of the plurality of resource data and the merit quantitative field, wherein the resource model is displayed on at least a niche client device and the plurality of resource models are displayed in order of ranking;
computing by the computing device, a niche model, wherein the niche model comprises:
  a plurality of niche data; and
  an output quantitative field, wherein the output quantitative field is generated as a function of a niche quantitative field machine-learning model, wherein generating the output quantitative field comprises:
    training the niche quantitative field machine-learning model using a training data comprising an output quantitative field data to a niche data; and
    generating the output quantitative field as a function of the niche quantitative field machine-learning model;
combining, by the computing device, the niche model with at least a selected resource model corresponding to a selected resource of the plurality of resources, wherein classifying further comprises:
  classifying the output quantitative field to at least a selected merit quantitative field of the at least a selected resource model; and
  classifying at least a niche datum of the plurality of niche data to at least a datum of the plurality of resource data; and
providing, by the computing device, an indication of the at least a selected resource model to from the at least a client device of the niche model, wherein providing the indication further comprises:
  automatically selecting a single resource;
  automatically informing the single resource as a function of the at least a client device;
  receiving an indication that the selected single resource is no longer available; and
  selecting the a second resource of the plurality of resource models, wherein selecting the second resource further comprises:
    receiving, from a user associated with the niche, a set of characteristics of the selected single resource; and
    selecting the second resource using the set of characteristics and a classification algorithm.

12. The method of claim 11, wherein the merit quantitative field further comprises a fuzzy set.

13. The method of claim 11, wherein the merit quantitative field further comprises a bivalent set defined on an interval.

14. The method of claim 11 further comprising tuning the biasing element as a function of a plurality of distributed factors, wherein the plurality of distributed factors comprises a quantitative datum received from the at least a niche client device and the tuning of the biasing element further comprises:
  receiving biasing training data correlating at least one of the plurality of distributed factors to the biasing element;
  tuning a biasing machine-learning using the biasing training data;
  generating the biasing element as a function of the biasing machine-learning model and the plurality of distributed factors.

15. The method of claim 11, wherein the output quantitative field further comprises a fuzzy set.

16. The method of claim 11, wherein the output quantitative field further comprises a bivalent set defined on an interval.

17. The method of claim 11, wherein combining the niche model to the at least a selected resource model further comprises combining the niche model to the at least a selected resource model using a classifying machine-learning process, wherein using the classifying machine-learning process comprises:
  generating a classifier;
  training the classifier using a classification training data, wherein the classification training data comprises niche models correlated to resource models; and
  combining the niche model with the at least a resource model as a function of the classifier.

18. The method of claim 11, wherein combining the niche model with the at least a selected resource model further comprises combining the niche model to a single resource model corresponding to a single resource of the plurality of resources, wherein combining the niche model to the single resource model further comprises:
  defining a direct-match subset of the plurality of niche elements;
  classifying a set of resource data of the plurality of resource data corresponding to the single resource model to the direct-match subset;
  classifying the merit quantitative field of the single resource model to the output quantitative field; and
  combining the single resource model to the niche model.

19. The method of claim 11, wherein the set of characteristics further comprises a degree of dissatisfaction with the selected single resource.

20. The method of claim 19, wherein classifying further comprises:
  translating the degree of dissatisfaction into a distance according to distance metric used in a clustering algorithm;
  identifying at least a clustering centroid that having a matching distance from the first selected resource model; and
  identifying the second resource model using the identified at least a clustering centroid.

* * * * *